United States Patent
Serrano Garcia et al.

(10) Patent No.: US 10,225,752 B2
(45) Date of Patent: Mar. 5, 2019

(54) FIRST NETWORK NODE, METHOD THEREIN, COMPUTER PROGRAM AND COMPUTER-READABLE MEDIUM COMPRISING THE COMPUTER PROGRAM FOR DETECTING OUTAGE OF A RADIO CELL

(71) Applicant: Telefonaktiebolaget LM Ericsson (publ), Stockholm (SE)

(72) Inventors: Inmaculada Serrano Garcia, Campanillas (ES); Raquel Barco Moreno, Malaga (ES); Isabel De La Bandera Cascales, Malaga (ES); Pablo Munoz Luengo, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 15/522,705

(22) PCT Filed: Oct. 28, 2014

(86) PCT No.: PCT/SE2014/051270
§ 371 (c)(1),
(2) Date: Apr. 27, 2017

(87) PCT Pub. No.: WO2016/068761
PCT Pub. Date: May 6, 2016

(65) Prior Publication Data
US 2018/0279139 A1    Sep. 27, 2018

(51) Int. Cl.
*H04W 24/04*    (2009.01)
*H04W 36/08*    (2009.01)
*H04W 24/10*    (2009.01)
*H04W 24/08*    (2009.01)

(52) U.S. Cl.
CPC .......... *H04W 24/04* (2013.01); *H04W 24/10* (2013.01); *H04W 36/08* (2013.01); *H04W 24/08* (2013.01)

(58) Field of Classification Search
CPC ..... H04W 24/04; H04W 24/10; H04W 24/08; H04W 36/08
USPC ........................................................ 370/329
See application file for complete search history.

(56) References Cited

U.S. PATENT DOCUMENTS

| | | |
|---|---|---|
| 2012/0295609 A1 | 11/2012 | Li et al. |
| 2012/0320766 A1 | 12/2012 | Sridhar |
| 2014/0043998 A1 | 2/2014 | Wang et al. |

FOREIGN PATENT DOCUMENTS

| | | | |
|---|---|---|---|
| CN | 103052110 A | 4/2013 | |
| EP | 2129175 A1 * | 12/2009 | ............ H04W 24/00 |

(Continued)

OTHER PUBLICATIONS

European Search Report, dated Jul. 31, 2017, in connection with European Application No. 14904820, all pages.

(Continued)

*Primary Examiner* — Chi Tang P Cheng
(74) *Attorney, Agent, or Firm* — Sage Patent Group

(57) ABSTRACT

A method performed by a first network node for detecting outage of a radio cell served by a second network node. The first network node and the second network node operate in a wireless communications system. The first network node determines a number of incoming handovers for the radio cell of the second network node in a first measurement period. The first network node then determines whether the radio cell is in outage, based on whether the determined number of incoming handovers in the first measurement period is under or equal to a threshold.

11 Claims, 6 Drawing Sheets

(56) References Cited

FOREIGN PATENT DOCUMENTS

| EP | 2129175 A1 | 12/2009 |
|---|---|---|
| EP | 2154918 A1 | 2/2010 |
| EP | 2934038 A1 | 10/2015 |
| WO | 2013143572 A1 | 10/2013 |

OTHER PUBLICATIONS

M. Amirijoo et al., Cell Outage Management in LTE Networks, Wireless Communication Systems, ISWCS 2009, 6th International Symposium, Sep. 7, 2009, Piscataway, NJ, USA, pp. 600-604.
De-La-Bandera et al., Cell Outage Detection Based on Handover Statistics, IEEE Communications Letters, vol. 19, No. 7, Jul. 2015, pp. 1189-1192.
Huawei, 3GPP TSG-RAN WG3 #75, R3-120128, Potential solutions for self healing, Dresden, Germany, Feb. 6-10, 2012, pp. 1-3.
PCT International Search Report, dated Aug. 31, 2015, in connection with International Application No. PCT/SE2014/051270, all pages.
PCT Written Opinion, dated Aug. 31, 2015, in connection with International Application No. PCT/SE2014/051270, all pages.
Q Liao et al., Toward cell outage detection with composite hypothesis testing, in Communications (ICC), 2012 IEEE International Conference on, Jun. 2012, pp. 4883-4887.
C Muller et al., A Cell Outage Detection Algorithm Using Neighbor Cell List Reports, in Proceedings of the 3rd International Workshop on Self-Organizing Systems (IWSOS) 2008, Lecture Notes in Computer Science (LNCS) 5343, Dec. 2008, pp. 218-229.

* cited by examiner

FIRST NETWORK NODE, METHOD THEREIN, COMPUTER PROGRAM AND COMPUTER-READABLE MEDIUM COMPRISING THE COMPUTER PROGRAM FOR DETECTING OUTAGE OF A RADIO CELL

TECHNICAL FIELD

The present disclosure relates generally to a first network node, and a method therein for detecting outage of a radio cell served by a second network node. The present disclosure relates as well to a computer program and a computer-readable storage medium, having stored thereon the computer program to carry out the aforementioned method.

BACKGROUND

Communication devices such as wireless devices are also known as, e.g., User Equipments (UE), mobile terminals, wireless terminals and/or mobile stations. Wireless devices are enabled to communicate wirelessly in a cellular communications network or wireless communication system, sometimes also referred to as a cellular radio system, wireless communications network, or cellular network. The communication may be performed, e.g., between two wireless devices, between a wireless device and a regular telephone, and/or between a wireless device and a server via a Radio Access Network (RAN) and possibly one or more core networks, comprised within the cellular communications network.

Wireless devices may further be referred to as mobile telephones, cellular telephones, laptops, tablets or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless communications network covers a geographical area which is divided into cell areas, wherein each cell area being served by an access node such as a base station, e.g., a Radio Base Station (RBS), which sometimes may be referred to as, e.g., "Evolved Node B (eNB)", "eNodeB", "NodeB", "B node", or Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

The consideration of automatic features has become a key element in the definition of new generation mobile networks in the last few years. The 3 rd Generation Partnership Project (3GPP) has included Self-Organizing Networks (SONs) as part of recent standards of mobile communications networks, also known as wireless communications networks, such as LTE (Long Term Evolution).

The SON functionalities are classified into three groups: Self-Configuration, Self-Optimization and Self-Healing. Self-Configuration functions aim to automatically define the configuration parameters of a network in the planning phase or when a new equipment is added to an existing infrastructure in the operational phase. The objective of Self-Optimization functions is to modify network parameters adapting the network to different environment conditions without human intervention. Self-Healing functions carry out the detection, diagnosis, compensation and recovery of network performance failures in an automatic manner.

One of the fundamental functions in Self-Healing is Cell Outage Detection (COD). A cell is in outage when it cannot carry traffic due to a failure. In this situation, it is very important to find out the cell outage as soon as possible to minimize the effects in the network.

There are several methods to implement COD. In most cases [1][2], the COD algorithm monitors Key Performance Indicators (KPIs) and alarms reported by cells to determine if they experience problems. KPIs are high-level indicators that may be obtained from performance counters in a wireless communications network. The performance counters may be measurements made by users, e.g., wireless devices, or base stations, that provide information about a cell and the network performance. In [3], the authors present a COD algorithm to detect outages based on the analysis of the KPIs reported by each cell, which allows to determine if any of its neighbor cells is in outage. In [4], a COD algorithm based on user measurements is presented. In an LTE network, the cells are controlled by an eNB. An eNB is a kind of radio access server controlling one or more, typically 3, radio cells, wherein each radio cell comprises one or more radio transmitter and radio receiver antennas, and wherein the radio connection of a terminal, e.g., a UE, to a telecommunications system is served by a certain cell of a certain eNB. When an eNB suspects that an own cell may be in outage, it requests a neighbor cell to gather measurements from the potential cell in outage. If this is not possible, the controlling eNB concludes that the cell is in outage. The COD algorithm proposed in [5] is based on the neighbor cell list reports which are able to detect cell outages in short time periods.

When there is a cell in outage in a network, different situations may occur. On the one hand, in some cases, the fault that causes the outage affects only the cell in outage. In this situation, the related eNB can provide the KPIs from this sector indicating that the sector is not available due to a problem. On the other hand, in other cases, the outage affects the entire eNB. When this occurs, there are no KPIs available in the OSS (Operations Support System) from any cell of the outage site. If the detection algorithm is based on monitoring the value of different KPIs of each cell, this outage situation cannot be detected.

In [1][2], the detection is based on KPIs and alarms reported by cells. With this methodology, it is possible to detect outage situations only if the eNB can supply KPIs from the outage cell to the OSS. However, if the outage affects the eNB, no KPIs will be available from the outage cell.

In [3], the authors present a COD algorithm based on the KPIs reported by each cell which allows determining if any of its neighbor cells is in outage. The effectiveness of this algorithm depends on the level of degradation in other cells caused by the cell in outage. This is an important limitation of the algorithm because in many cases a cell in outage does not cause a performance degradation in the neighbor cells.

Using the algorithm presented in [4], the outage problem cannot be detected if the outage affects the eNB because the measurement request cannot be sent.

The COD algorithm proposed in [5], is based on information reported on user traces and this feature is the main drawback of this approach because the use of traces limits the bandwidth of the system and operators are unwilling to activate them.

Thus, existing COD methods are inadequate for cell outage detection, especially when the eNode serving the affected cell is also affected, which leads to degradation of the wireless communication method.

SUMMARY

It is an object of embodiments herein to provide a way of improving the performance in a wireless communications network.

According to a first aspect of embodiments herein, the object is achieved by a method performed by a first network node for detecting outage of a radio cell served by a second network node. The first network node and the second network node operate in a wireless communications system. The first network node determines a number of incoming handovers for the radio cell of the second network node in a first measurement period. The first network node then determines whether the radio cell is in outage. This is done based on whether the determined number of incoming handovers in the first measurement period is under or equal to a threshold.

According to a second aspect of embodiments herein, the object is achieved by the first network node. The first network node is configured to detect the outage of the radio cell served by the second network node. The first network node and the second network node are configured to operate in the wireless communications system. The first network node is further configured to determine the number of incoming handovers for the radio cell of the second network node in a first measurement period. The first network node is also configured to determine whether the radio cell is in outage. This is done based on whether the determined number of incoming handovers in the first measurement period is under or equal to the threshold.

According to a third aspect of embodiments herein, the object is achieved by a computer program, comprising instructions which, when executed on at least one processor, cause the at least one processor to carry out the method performed by the first network node.

According to a fourth aspect of embodiments herein, the object is achieved by a computer-readable storage medium, having stored thereon the computer program, comprising instructions which, when executed on at least one processor, cause the at least one processor to carry out the method performed by the first network node.

By determining the number of incoming handovers for the radio cell of the second network node in the first measurement period, it is possible for the first network node to determine whether the radio cell is in outage. The first network node is capable of detecting cell outages not only when the cell in outage is able to report one or more performance indicators, but also when these indicators are not available because the second network node itself is affected, since the algorithm may be based, e.g., on the number of handovers that are measured in neighbor cells. With this information, the number of incoming handovers for the affected radio cell is obtained. Another advantage of embodiments herein is that the detection algorithm is based on performance counters that are usually available in the OSS, so that additional information, such as user traces, may not be needed.

Also, unlike other existing solutions, the provided algorithm according to embodiments herein is independent of the level of degradation in neighbor cells caused by the cell in outage. When a cell is in outage, the handovers from a neighbor radio cell to the affected radio cell may not be carried out, but this is independent of whether the neighbor cell is degraded or not due to the outage.

A further advantage of embodiments herein is that due to the simplicity of the algorithm, it is possible to execute the algorithm and detect outages every time the performance counters are updated. That is, immediately after collecting the KPIs.

BRIEF DESCRIPTION OF THE DRAWINGS

Examples of embodiments herein are described in more detail with reference to attached drawings in which.

DETAILED DESCRIPTION

Figure 1:
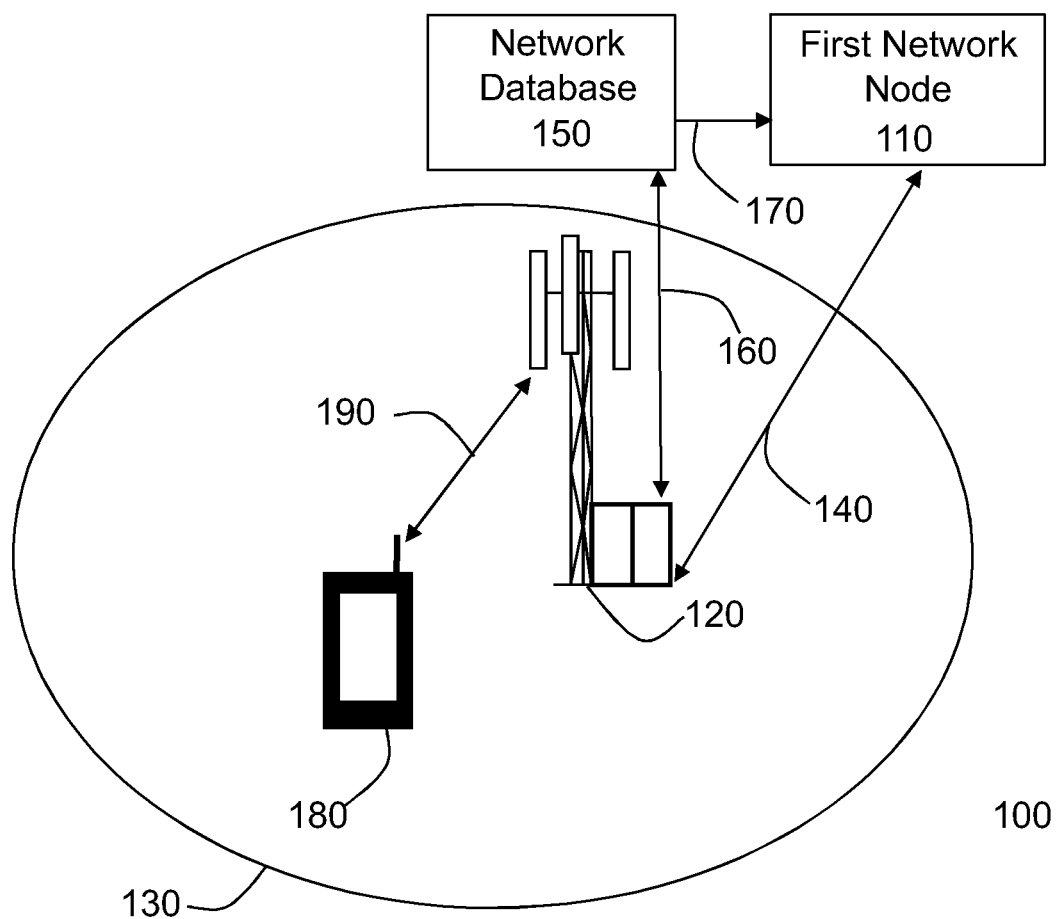
FIG. 1 is a schematic block diagram illustrating embodiments in a wireless communications network, according to embodiments herein.

Embodiments herein provide for a COD algorithm that overcomes the problems of the existing methods discussed earlier, so that this algorithm is capable of detecting cell outages even if the eNB is also affected. The proposed algorithm monitors the number of incoming handovers measured on a per cell basis. Specifically, the proposed algorithm may monitor situations where the number of incoming handovers becomes zero, typically, as a potential symptom of cell outage.

The calculation of the number of incoming handovers for each cell is made based on the handovers statistics measured on a per adjacency basis. That is, the algorithm may be based on neighbor measurements, so that this algorithm may be capable of detecting cell outages even if the eNB is also affected, as one or more of the neighbor cells may be served by an eNB different than the eNB serving the affected cell. If the outage does not affect the serving eNB, some neighbor cells considered for the handover statistics may be served by the same eNB than the outage cell. However, if the outage affects the eNB, all the considered neighbor cells may be served by other eNBs. So that, in this case, at least one of the neighbor cells has to be served by another eNB.

Per adjacency basis refers to the fact that the number of handovers KPI may be defined associated with a source and a target cell. To calculate a number of incoming handovers per cell, the source cells for every target cell, may need to be aggregated. There may be different mechanisms to determine the adjacent cells for a certain cell depending on the technology or vendor. Each mechanism may be based on different conditions to select a cell as adjacent cell. For example, in LTE networks, an algorithm called Automatic Neighbor Relation selects the adjacent cells for a certain cell based on the user measurements. For example, a neighbor cell may be selected as adjacent cell and included in a neighbor list if the users from the serving cell can detected it with a minimum level of signal. The users may perform handovers only with the cells that are included in the neighbor list of the source cell.

The algorithm may check the KPIs related to the availability of each cell, to check if the cell is active or manually switched off by the operator. The disclosed algorithm allows detecting cell outages not only when there are available KPIs from the outage cell, but also when the outage problem affects the eNB and there are no KPIs available from the problematic cell, because the algorithm is based on neighbor measurements.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

FIG. 1 depicts a particular example of a wireless communications network 100, sometimes also referred to as a cellular radio system, cellular network, mobile network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access, Universal Terrestrial Radio Access (UTRA) TDD, GSM network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3 rd Generation Partnership Project (3GPP) cellular network, WiFi networks, Worldwide Interoperability for Microwave Access (WiMax), 5G system, system operating in mmW bands or any cellular network or system.

The wireless communications network 100 comprises a first network node 110. The first network node 110 may be, for example, a core network node such as a Management System network node 110. The Management System network node may be any network node that has access to the network KPIs and may modify network configuration parameters, i.e., a node responsible of the network management. The first network node 110 may also be any node, internal or external, that has access to the network KPIs.

The wireless communications network 100 comprises a second network node 120. The second network node 120 may be, for example, a base station such as e.g., an eNB, eNodeB, or a Home Node B, a Home eNode B, femto Base Station, BS, pico BS, a macro eNodeB, access node or any other network unit capable to serve a wireless device or a machine type communication device in the wireless communications network 100. In some particular embodiments, the second network node 120 may be a stationary relay node or a mobile relay node. The wireless communications network 100 covers a geographical area which is divided into cell areas, wherein each cell area is served by a network node, although, one network node may serve one or several cells, and one cell can be served by one or several network nodes. In the non-limiting example depicted in FIG. 1, the second network node 120 serves a radio cell 130. The second network node 120 may be of different types, based on transmission power and thereby also cell size. For example, a pico base station has low transmission power and a macro eNodeB has high transmission power. Typically, wireless communications network 100 may comprise more cells similar to the radio cell 130, served by their respective radio network node. This is not depicted in FIG. 1 for the sake of simplicity. The second network node 120 may support one or several communication technologies, and its name may depend on the technology and terminology used. In 3GPP LTE, the second network node 120 is directly connected through a first link 140 to one or more core networks, of which only the first network node 110 is depicted in FIG. 1. In some particular embodiments, a network database 150 may be comprised in the wireless communications network 100. The network database 150 may store the KPIs of the wireless communications network 100, such as the KPIs of the second network node 120. In some embodiments, the network database 150 may be connected to the second network node 120 through a second link 160, and to the first network node 110 through a third link 170. The network database 150 may be an OSS database.

The wireless communications network 100 also comprises a wireless device 180. The wireless device 180 operates in the wireless communications network 100. The wireless device 180 is a wireless communication device or radio communication device such as a UE, which is also known as e.g., mobile terminal, wireless terminal, mobile station, mobile telephone, cellular telephone, smart phone, and/or target device. Further examples of different wireless devices include laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, device to device (D2D) UE or wireless devices, devices equipped with a wireless interface, such as a printer or a file storage device, Machine Type Communication (MTC) devices such as sensors, e.g., a sensor equipped with UE, just to mention some examples.

The wireless device 180 is enabled to communicate, e.g., voice and/or data, wirelessly in the wireless communications network 100. The communication may be performed e.g., between two devices, between a device and a regular telephone and/or between a device and another entity, such as a server or any other radio network unit capable of communicating over a radio link in the wireless communications network 100. The communication may be performed e.g., via a Radio Access Network.

The wireless device 180 is located within the radio cell 130. The wireless device 180 is configured to communicate with the second network node 120 over a radio link 190.

Embodiments of a method performed by the first network node 110 for detecting outage of the radio cell 130 served by the second network node 120, will now be described with reference to the flowchart depicted in FIG. 2. The first network node 110 and the second network node 120 operate in the wireless communications system 100.

Figure 2:
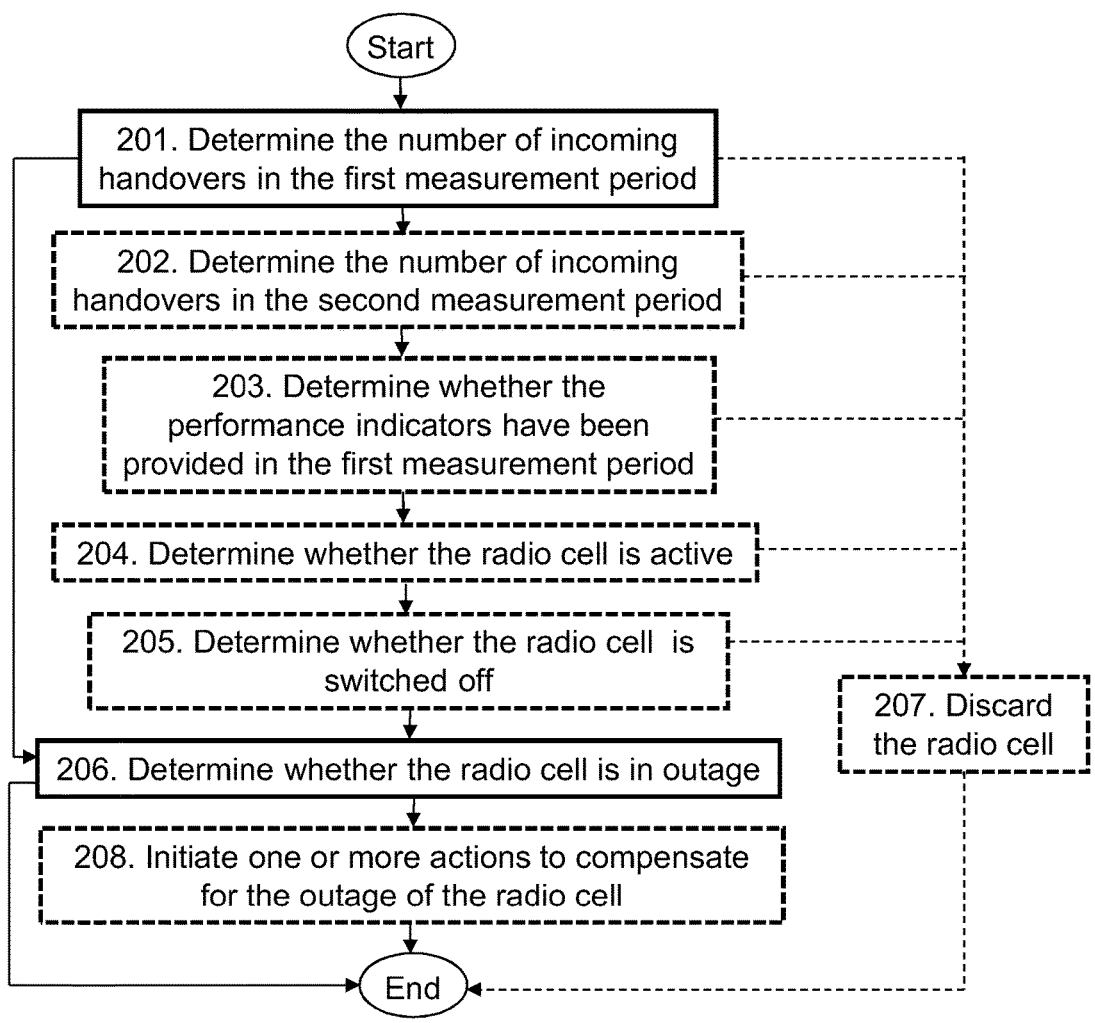
FIG. 2 is a schematic block diagram illustrating an exemplary system.

FIG. 2 depicts a flowchart of the one or more actions that are or may be performed by the first network node 110 in embodiments herein. In the Figure, a box with dashed lines indicates that the action is optional.

The method for transmitting may comprise the following actions, which actions may as well be carried out in another suitable order than that described below. In some embodiments, all the actions may be carried out, whereas in other embodiments only some action/s may be carried out.

Action 201

In order to determine whether the radio cell 130 is in outage, the first network node 110 may first determine a number of incoming handovers for the radio cell 130 of the second network node 120 in a first measurement period. The number of incoming handovers is associated with one or more source cells and the target cell, that is, the radio cell 130. The one or more source cells may be neighbor cells to the radio cell 130. To calculate the number of incoming handovers for the radio cell 130, a sum of all handovers with the radio cell 130 as the target cell of the handovers may be calculated. The one or more source cells may be served by the same network node 120 as the radio cell 130 in a handover process, or by one or more different network nodes, as explained earlier. In the event that the outage affects the network node 120, at least one of the considered neighbor cells has to be served by network node.

In some embodiments, a number of incoming HandOvers for the radio cell 130 of the second network node 120 in a first measurement period may be referred to as inHO.

Figure 3:
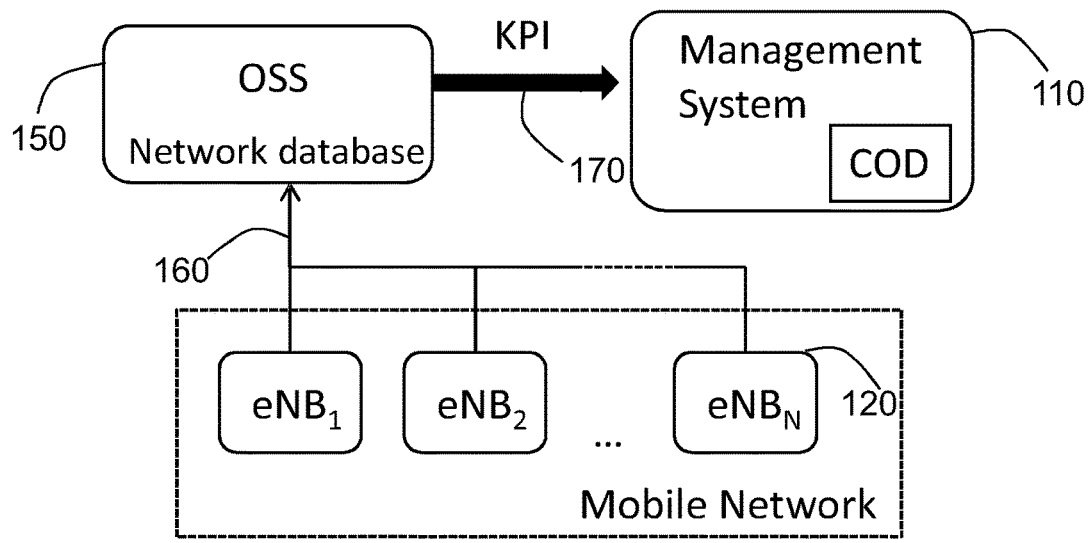
FIG. 3 is a schematic diagram of a method according to embodiments herein.

The first network node 110 may implement this action by obtaining KPIs on handover statistics for the radio cell 130 from radio cells in the wireless communications network 100, which are neighbor radio cells to the radio cell 130. FIG. 3 shows a block diagram illustrating an embodiment of the first network node 110 that implements the method disclosed herein, which method may also be referred to herein as "the COD algorithm" or simply "the algorithm", and the relations of the first network node 110 with other structures of the wireless communications network 100. The proposed algorithm may be implemented as part of any Management System included in the wireless communications network 100, as shown in FIG. 3. The first network node 110 may be connected with the OSS to collect the KPIs from the monitored wireless communications network 100, in which the second network node 120 is comprised. The periodicity of updating these KPIs may determine, in some embodiments, the minimum periodicity of execution of the COD algorithm.

The first measurement period is a configurable parameter which determines the time period between two executions of the algorithm. For example, in some embodiments, this measurement period may be equal or higher than the periodicity of updating KPIs in the OSS.

Figure 4:
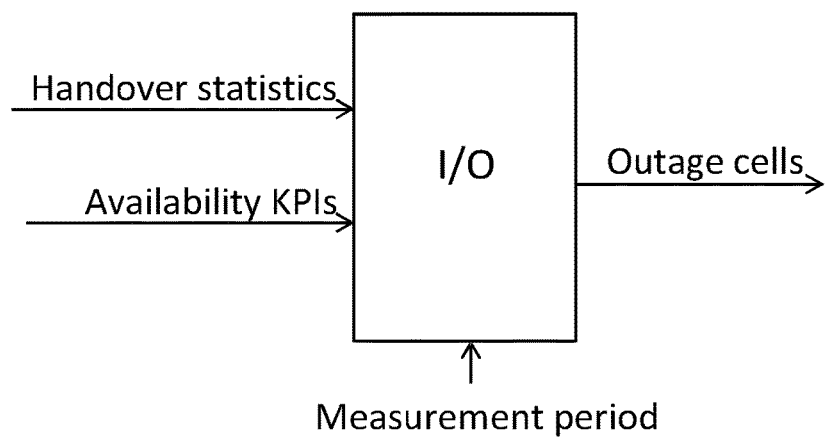
FIG. 4 is a schematic diagram depicting embodiments of a method in a first network node, according to embodiments herein.

The KPIs needed for the proposed algorithm may be the handover statistics on a per adjacency basis, and, in some embodiments, the KPIs related to the availability of each cell, i.e., the availability KPIs. FIG. 4 represents the algorithm as a "black-box" showing what may be its inputs and output (I/O). The output of the algorithm may, in some embodiments, be a list of detected cells in outage.

Action 202

Throughout the running of the method, the first network node 110 may disqualify or discard the radio cell 130, when a number of conditions are met. These conditions may indicate that the radio cell 130 may already be in outage, or they may indicate that the radio cell 130 is not in outage, without a need to run the whole algorithm until its completion. By discarding the radio cell 130 in these conditions, before the algorithm is completed, processing time and resources may be spared.

A first group of these conditions may be when the radio cell 130 has had no incoming handovers for a prolonged time, e.g., for two consecutive measurement periods. A first one of these conditions in this group may point to the fact that the radio cell 130 is not in outage. This condition may be when traffic in the radio cell 130 is extremely low, so that there are no incoming handovers for prolonged periods of time. In these cases, there may not have been any handovers between the radio cell 130 and its neighbors in a previous measurement period, without that meaning that the radio cell 130 is in outage. Such cases of prolonged lack of incoming handovers, may be discarded from further analysis, as they probably mean that the radio cell 130 is not in outage. Another condition may be when the radio cell 130 was already in outage in a previous measurement period. In such case, the outage of the radio cell 130 may have already been detected previously, and therefore, it may not be necessary to run the radio cell 130 through the whole algorithm again. It may instead be assumed that the radio cell 130 is still in outage in the following measurement period.

In order to determine if any of the conditions of this first group is met, and potentially interrupt early the running of the algorithm, in this action, the first network node 110 may determine a number of incoming handovers for the radio cell 130 of the second network node 120 in a second measurement period, wherein the second measurement period is a previous measurement period to the first measurement period.

The second measurement period may be equivalent to the first measurement period, as defined herein, only that it has taken place before the first measurement period. The value corresponding to the number of incoming handovers for the radio cell 130 of the second network node 120 in the second measurement period may have been stored in a previous iteration of the algorithm. The first network node 110 may then collect the number of incoming handovers for the radio cell 130 in the second measurement period from stored data. The stored data may be held, for example, in the first network node 110.

In some embodiments, the first network node 110 may determine if the number of incoming handovers for the radio cell 130 of the second network node 120 in the second measurement period is equal to zero. If the number is equal to zero, the radio cell 130 may be discarded, as described in action 207.

In some particular embodiments, this action will be performed if the number of incoming handovers for the radio cell 130 in the first measurement period is under or equal to a threshold, e.g., equal to zero, as determined in action 201.

Action 203

Another condition that may indicate that the radio cell 130 may be in outage, without a need to run the whole algorithm until its completion, is when the first network node 110 obtains information that the second network node 120 serving the radio cell 130 may itself be out of function. Such is the case when KPIs for the second network node 120 have not been provided during the first measurement period. To check if this was the case, the first network node 110 may check the one or more performance indicators, e.g., the availability KPIs, provided by the second network node 120 before determining whether the radio cell 130 is in outage. Thus, in this action, the first network node 110 may determine whether the one or more performance indicators of the second network node 120 have been provided in the first measurement period. In the embodiments in which only one performance indicator is provided, this indicator is an availability KPI, that is, a KPI that provides information about the availability of the radio cell 130.

In some embodiments, the one or more performance indicators, such as the availability KPIs, may have been provided to the first network node 110 by the network database 150. The one or more performance indicators may have been provided in turn to the network database 150 by the second network node 120.

In some particular embodiments, this action will be performed if the number of incoming handovers for the radio cell 130 in the first measurement period is under or equal to a threshold, e.g., equal to zero, as determined in action 201.

In some particular embodiments, this action will be performed if the number of incoming handovers for the radio cell 130 in the second measurement period is higher the threshold, e.g., higher than zero, as determined in action 202.

In some particular embodiments, this action will be performed if the number of incoming handovers for the radio cell 130 in the first measurement period is under or equal to the threshold, and the number of incoming handovers for the radio cell 130 in the second measurement period is higher the threshold, e.g., higher than zero.

Action 204

Another condition that may indicate that the radio cell 130 may be in outage, without a need to run the whole algorithm until its completion, is when the first network node 110 obtains information that the radio cell 130 was not active during the first measurement period, despite the fact that the second radio node 120 provided KPIs during the first measurement period, i.e., the second radio node 120 was itself not in outage. To check if this is the case, in this action, the network node 110 may check one or more parameters relating to the radio cell 130, which show whether the radio cell 130 had some activity during the first measurement period, which activity was not receiving incoming handovers. If the radio cell 130 did not happen to receive any incoming handovers in the first measurement period, but was otherwise active, then the radio cell 130 may be discarded as not being in outage. This may happen, for example, when traffic during the first measurement period was very low.

This action may be implemented by checking if one or more performance indicators, e.g., availability KPIs, have been provided for the radio cell 130 for the first measurement period. For example, if a counter that indicates the number of seconds that the radio cell 130 has been switched off manually or automatically is equal to zero during the first measurement period, this may indicate that the radio cell 130 has been active in this first measurement period.

In some particular embodiments, this action will be performed if the number of incoming handovers for the radio cell 130 in the first measurement period is under or equal to a threshold, e.g., equal to zero, as determined in action 201.

In some particular embodiments, this action will be performed if the number of incoming handovers for the radio cell 130 in the second measurement period is higher the threshold, e.g., higher than zero, as determined in action 202.

In some particular embodiments, this action will be performed if the one or more performance indicators of the second network node 120 have been provided in the first measurement period, as determined in action 203.

In some particular embodiments, this action will be performed if the number of incoming handovers for the radio cell 130 in the first measurement period is under or equal to the threshold, the number of incoming handovers for the radio cell 130 in the second measurement period is higher the threshold, e.g., higher than zero, and the one or more performance indicators of the second network node 120 have been provided in the first measurement period.

Action 205

In some instances, the radio cell 130 may have been switched off by the operator for maintenance tasks or energy saving reasons. If the radio cell 130 has been switched off by the operator, then the radio cell 130 seem to be in outage, but not actually be in outage, resulting in a false positive. Therefore, in this action, the first network node 110 may determine whether the radio cell 130 is switched off. This action may be implemented by checking if a counter that indicates the number of seconds that the radio cell 130 has been switched off during the first measurement period is higher than zero. The counters that may be checked to determine whether the radio cell 130 is switched off, manually or automatically, in this action, may be the same that the counters considered to determine whether the radio cell 130 is active or not in action 204, depending on the concrete value. In action 204, the condition to discard the radio cell 130 is that this cell is active, and in the action 205, the condition is that the radio cell 130 is switched off, manually.

In some particular embodiments, this action will be performed if the number of incoming handovers for the radio cell 130 in the first measurement period is under or equal to a threshold, e.g., equal to zero, as determined in action 201.

In some particular embodiments, this action will be performed if the number of incoming handovers for the radio cell 130 in the second measurement period is higher the threshold, e.g., higher than zero, as determined in action 202.

In some particular embodiments, this action will be performed if the one or more performance indicators of the second network node 120 have been provided in the first measurement period, as determined in action 203.

In some particular embodiments, this action will be performed if the radio cell 130 was not active in the first measurement period, as determined in action 204.

In some particular embodiments, this action will be performed if the number of incoming handovers for the radio cell 130 in the first measurement period is under or equal to the threshold, the number of incoming handovers for the radio cell 130 in the second measurement period is higher the threshold, e.g., higher than zero, the one or more performance indicators of the second network node 120 have been provided in the first measurement period, and the radio cell 130 was not active in the first measurement period.

Action 206

In this action, the first network node 110 determines whether the radio cell 130 is in outage, based on whether the determined number of incoming handovers in the first measurement period, as determined in action 201, is under or equal to the threshold. The threshold may be a configurable number of incoming handovers. Typically, the determining whether the radio cell 130 is in outage may be based on whether the determined number of incoming handovers in the first measurement period is equal to the threshold of zero.

In some embodiments, the threshold may be configured to be higher than zero, to detect the cases when the radio cell 130 may have gone into outage into the measurement period, after more than 0 incoming handovers have been received by the second network node 120. The first radio node 110 may in these embodiments consider a timing of the incoming handovers, e.g., a time stamp, and correlate that with a timing of: the KPIs provided according to action 203, the activity of the cell according to action 204, and whether the radio cell 130 has been switched off according to action 205. However these particular embodiments may require using user traces.

In general, the first network node 110 may determine that the radio cell 130 is in outage further based on the outcome of the actions 202-205.

In some embodiments, the determining whether the radio cell 130 is in outage, is further based on whether the determined number of incoming handovers in the second measurement period in action 202 is higher or equal to the threshold.

In some particular embodiments, the determining whether the radio cell 130 is in outage is based on whether the determined number of incoming handovers in the second measurement period is equal to the threshold of zero. That is, if the determined number of incoming handovers in the second measurement period in action 202 is higher than the threshold of zero, then the radio cell 130 may be in outage, depending on the outcome of actions 203-205. However, if the determined number of incoming handovers in the second measurement period in action 202 is equal to the threshold of zero, then the radio cell 130 may be discarded according to action 207. As explained earlier, this may be due to the fact that the radio cell 130 is in outage and this was detected previously. That is, the radio cell 130 is suffering an outage that lasts more than one measurement period. The fact that the determined number of incoming handovers in the second measurement period in action 202 is equal to the threshold of zero may also be due to the fact that the radio cell 130 has a very low traffic and it does not have incoming handovers. This situation may not be as likely because typically, when a cell is active, it has handovers.

In some embodiments, the determining whether the radio cell 130 is in outage is further based on whether one or more performance indicators have been provided by the second network node 120 in the first measurement period, as determined in action 203. If no performance indicators have been provided by the second network node 120 in the first measurement period, then the radio cell 130 is in outage. Whereas, if one or more performance indicators have been provided by the second network node 120 in the first measurement period, whether the radio cell 130 is in outage or not, may depend on the outcome of actions 204-205.

In some embodiments, the determining whether the radio cell 130 is in outage, is further based on at least one of: whether the radio cell 130 is active in the first measurement period, as determined in action 204, and whether the radio cell 130 is switched off in the first measurement period, as determined in action 205.

Based on the foregoing, in some embodiments, the first network node 110 may determine that the radio cell 130 is in outage when the following conditions are met: 1) the determined number of incoming handovers in the first measurement period is equal to the threshold of zero, 2) the determined number of incoming handovers in the second measurement period is not equal to the threshold of zero, and 3) one of: a) the one or more performance indicators in the first measurement period have not been provided by the second network node 120, or b) the one or more performance indicators in the first measurement period have been provided by the second network node 120, the radio cell 130 is not active in the first measurement period, and the radio cell 130 is not switched off in the first measurement period.

Action 207 the first network node 110 determines, before the algorithm is completed, that a number of conditions have been met, indicating that the radio cell 130 may or may not be in outage, but running of the whole algorithm is not necessary. This is done so that processing time and resources may be spared by stopping the running of the algorithm early.

As discussed earlier, the first network node 110 may discard the radio cell 130 when any of the number of conditions are met that point to the fact that the radio cell 130 is not in outage, or may have already been determined to be in outage. Thus, in this action, the first network node 110 may discard the radio cell 130 when the first network node 110 determines that at least one of the following conditions are met: a) the determined number of incoming handovers in the first measurement period is higher than the threshold of zero; b) the determined number of incoming handovers in the second measurement period is equal to the threshold of zero; c) the one or more performance indicators in the first measurement period have been provided by the second network node 120 and the radio cell 130 is active in the first measurement period, and d) the one or more performance indicators in the first measurement period have been provided by the second network node 120 and the radio cell 130 is switched off in the first measurement period.

Action 208

When an outage problem is detected in the wireless communications network 100, the first network node 110 may execute one or more tasks in order to reduce the degradation caused by the outage in the network performance. For this reason, the next step after an outage of the radio cell 130 is detected may be to try to mitigate its negative effects. Thus, in this action, based on the determining whether the radio cell 130 is in outage of action 206, the first network node 110 may initiate one or more actions to compensate for the outage of the radio cell 130.

An example of the one or more actions that may be initiated by the first network node 110 is the functionality known as Cell Outage Compensation (COC). The first network node 110, through a COC algorithm, may decide a set of configuration parameter changes in order to reduce the caused degradation. For example, the antenna tilt angle may be reduced, e.g. uptilt, in order to improve the coverage in the area affected by the outage.

In this way, the first network node 110 may be able to detect an outage problem by the COD described herein and, subsequently, the degradation may be reduced by a COC until the problem is solved.

By initiating it is meant herein that the first network node 110 may perform the compensation for the outage of the radio cell 130 itself, or that it may instruct another network node to perform those one or more actions, by for example sending a message to such a network node.

Figure 5:
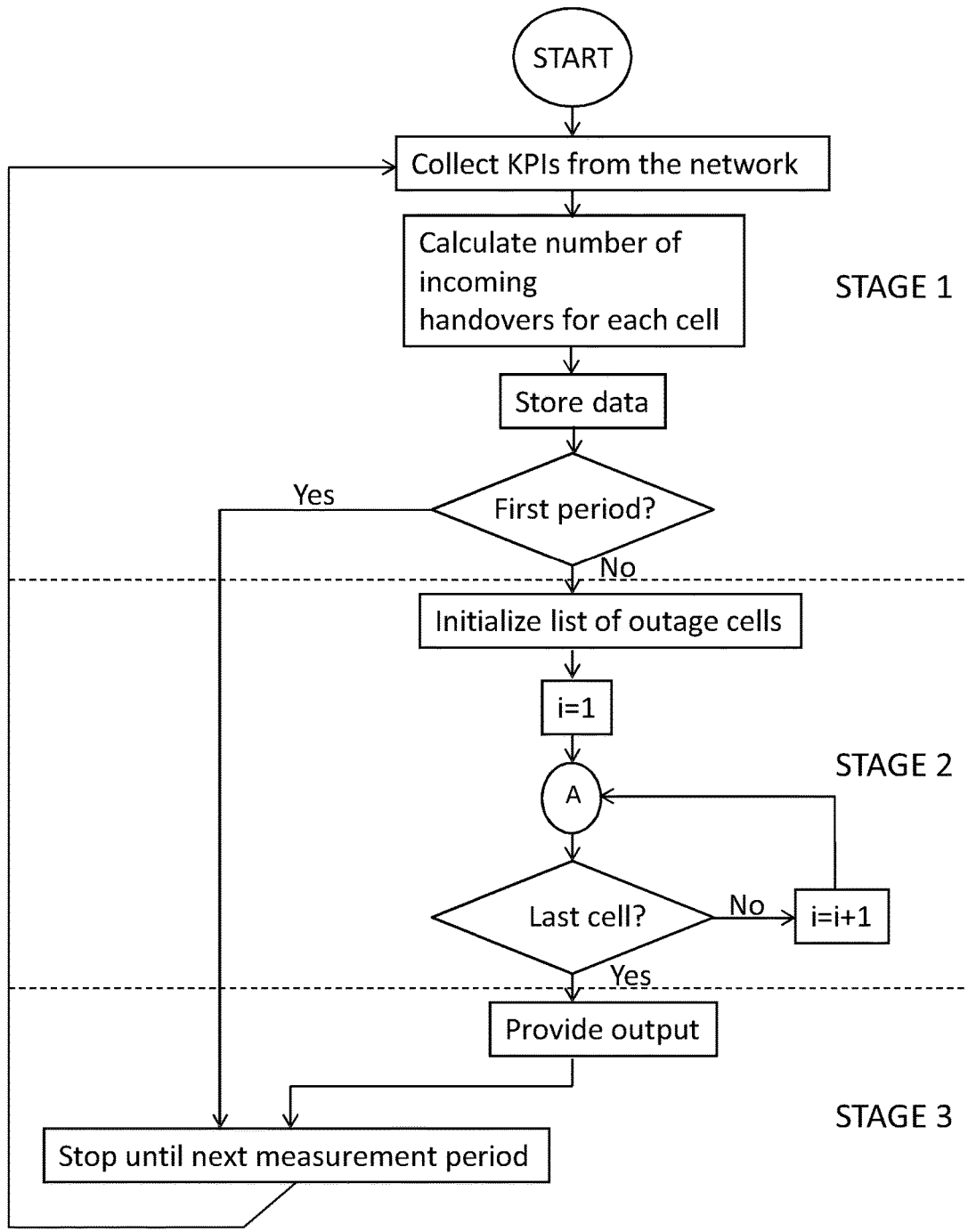
FIG. 5 is a flowchart depicting embodiments of a COD method in a first network node, according to embodiments herein.

Once the KPIs have been updated, a new iteration of the algorithm, that is, of actions 201-208 may be executed. FIG. 5 shows a flow diagram of an embodiment of the algorithm disclosed herein, with further actions that may precede actions 201-208, and actions that may follow actions 201-208. In a first stage, the KPIs for the measurement period may be collected from the wireless communications network 100, e.g., from the network database 150, as shown in FIG. 3. A number of incoming handovers on a per cell basis may be calculated based on the handover statistics per adjacency. These values may be stored. If it is the first measurement period in which the algorithm is activated, the next step may be to wait for the next measurement period, so information on the second measurement period, which is a previous measurement period, is available. If it is not the first measurement period in which the algorithm is activated, the second stage may be executed for each cell of the network, including radio cell 130, as described above in actions 201-207. Thus, a list of potential outage cells may be initialized, represented in the Figure by setting a counter i to 1, and actions 201-207 may be implemented for each cell i of the network, including radio cell 130. If the last cell i has not been run through the Algorithm (A), the next cell i+1 may be run through actions 201-207. Finally, in a third stage, a list of detected cell outages among the i cells may be obtained, and the algorithm may be stopped until the next measurement period. That is, for example until the next time the KPIs are updated. Action 208 may be executed after a first cell is detected to be in outage, or after the algorithm has been run for all cells i for the first measurement period.

Figure 6:
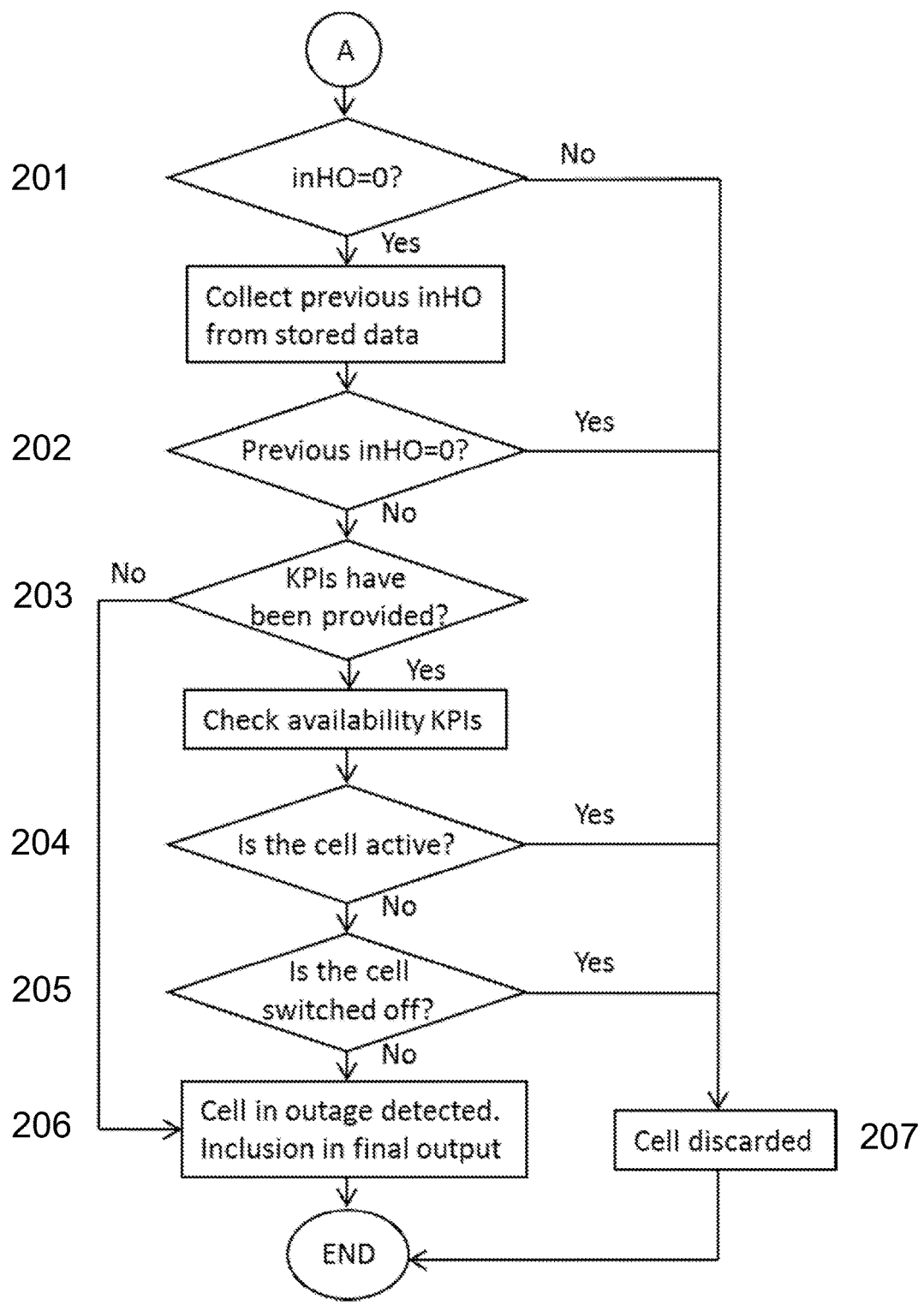
FIG. 6 is a flowchart depicting embodiments of a second stage of a COD method in a first network node, according to embodiments herein.

The decision to determine if a cell is in outage is made in the second stage of the algorithm, which corresponds to actions 201-207 described above. FIG. 6 shows a detailed flow diagram of a particular embodiment of this stage of the algorithm. In this particular embodiment, the threshold is zero. Firstly, as described in action 201, it is checked if the number of incoming HandOvers (inHO) calculated in the first measurement period, that is, the current measurement period, is equal to zero. In the case that it is not zero, the cell may be discarded, as described in action 207. In the next step, the number of incoming handovers in the previous measurement period is collected. This value may have been stored in a previous iteration of the algorithm. The value may then be compared with zero, as described in action 202. If this number is equal to zero, the cell may be discarded in action 207. The result of these rules, that is, inHO=0 in the first measurement period and inHO>0 in the second measurement period, may be a set of cells that may be inactive in the current measurement period. Some of the selected cells might have been switched off by the operator for maintenance tasks or energy saving reasons. Moreover, some cells may lead to false positives due to very low traffic. In these both cases, it may be necessary to check the availability KPIs to do the selection, as described in action 203. If the availability KPIs determine that a certain cell has been manually switched off—action 205— or it is available—action 204—, the cell may be discarded in action 207. Otherwise, the cell may be selected as cell in outage in action 206.

Embodiments of the algorithm disclosed herein may be extended to any mobile communication technology since it is based on basic one or more performance indicators that are present in all mobile networks.

To perform the method actions described above in relation to FIGS. 2-6, the first network node 110 is configured to detect the outage of the radio cell 130 served by the second network node 120. The first network node 110 comprises the following arrangement depicted in FIG. 7. As stated earlier, the first network node 110 and the second network node 120 are configured to operate in the wireless communications system 100.

The detailed description of some of the following corresponds to the same references provided above, in relation to the actions described for the first network node 110, and will thus not be repeated here.

The first network node 110 is configured, e.g., by means of a determining module 701 to determine the number of incoming handovers for the radio cell 130 of the second network node 120 in the first measurement period. The determining module 701 may be accomplished by a processor 704 of the first network node 110, in cooperation with a receiving port 705 configured to receive information messages from other node/s, and in cooperation with a memory 706 configured to store data, e.g., in the form of computer readable instructions, to be executed by the processor 704, so as to execute any of the described embodiments. Any of the receiving port 705 and the memory 705 may be a module or a device, and are described later.

The first network node 110 may be further configured to, e.g. by means of the determining module 701 determine whether the radio cell 130 is in outage, based on whether the determined number of incoming handovers in the first measurement period is under or equal to a threshold.

In some embodiments, to determine whether the radio cell 130 is in outage is based on whether the determined number of incoming handovers in the first measurement period is equal to the threshold of zero.

The first network node 110 may be further configured to determine whether the radio cell 130 is in outage, further based on whether one or more performance indicators have been provided by the second network node 120 in the first measurement period.

In some embodiments, the first network node 110 may be further configured to determine whether the radio cell 130 is in outage, further based on at least one of: whether the radio cell 130 is active in the first measurement period whether the radio cell 130 is switched off in the first measurement period The first network node 110 may be further configured to determine that the radio cell 130 is in outage when: 1) the determined number of incoming handovers in the first measurement period is equal to the threshold of zero; and 2) the determined number of incoming handovers in the second measurement period is not equal to the threshold of zero, and one of: a) the one or more performance indicators in the first measurement period have not been provided by the second network node 120, or b) the one or more performance indicators in the first measurement period have been provided by the second network node 120, the radio cell 130 is not active in the first measurement period, and the radio cell 130 is not switched off in the first measurement period.

The first network node 110 may be further configured to, e.g. by means of the determining module 701 determine the number of incoming handovers for the radio cell 130 of the second network node 120 in the second measurement period. As explained earlier, the second measurement period is the previous measurement period to the first measurement period. In some of these embodiments, to determine whether the radio cell 130 is in outage, is further based on whether the determined number of incoming handovers in the second measurement period is higher or equal to the threshold.

In some embodiments, to determine whether the radio cell 130 is in outage is based on whether the determined number of incoming handovers in the second measurement period is equal to the threshold of zero.

The first network node 110 may be further configured to, e.g., by means of an discarding module 702, discard the radio cell 130 when the first network node 110 determines that at least one of: a) the determined number of incoming handovers in the first measurement period is higher than the threshold of zero; b) the determined number of incoming handovers in the second measurement period is equal to the threshold of zero; c) the one or more performance indicators in the first measurement period have been provided by the second network node 120 and the radio cell 130 is active in the first measurement period, and d) the one or more performance indicators in the first measurement period have been provided by the second network node 120 and the radio cell 130 is switched off in the first measurement period. The discarding module 702 may work in cooperation with the determining module 701 by further processing its results, and may be accomplished by the processor 704 of the first network node 110, in cooperation with the memory 706 configured to store data, e.g., in the form of computer readable instructions, to be executed by the processor 704, so as to execute any of the described embodiments. As stated earlier, the memory 706 may be a device or a module.

The first network node 110 is further configured to, e.g., by means of an initiating module 703, based on the determination of whether the radio cell 130 is in outage, to initiate one or more actions to compensate for the outage of the radio cell 130. The initiating module 703 may work in cooperation with the determining module 701 and, preferably, also in cooperation with the discarding module 702. The initiating module 703 may be accomplished by the processor 704 of the first network node 110, in cooperation with the memory 706 configured to store data, e.g., in the form of computer readable instructions, to be executed by the processor 704, so as to execute any of the described embodiments, and also in cooperation with the sending port 705, configured to send information messages to other node/s, e.g., so as to compensate for the outage of a radio cell. As stated earlier, any of the receiving port 705 and the memory 705 may be a module or a device.

Figure 7:
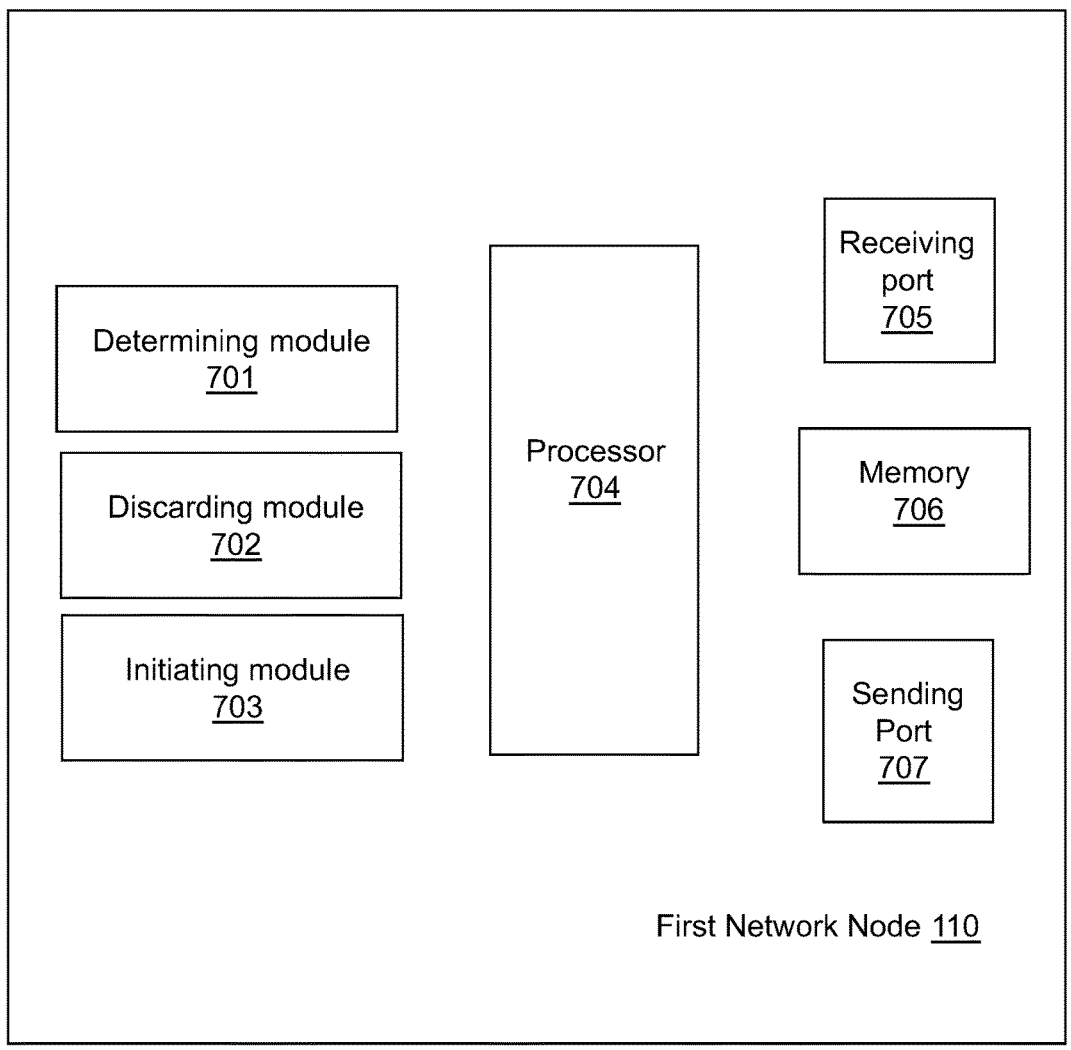
FIG. 7 is a schematic block diagram illustrating embodiments of a first network node, according to embodiments herein.

The embodiments herein to detect outage of the radio cell 130 served by the second network node 120 may be implemented through one or more processors, such as the processor 704 in the first network node 110 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first network node 110. One such carrier may be in the form of a CD ROM disc. It may be however feasible with other data carriers such as a memory stick. The computer program code may furthermore be provided as pure program code on a server and downloaded to the first network node 110.

In some embodiments, information may be received from, e.g., the network database 150, or the second network node 120 through the receiving port 705. In other embodiments, the first network node 110 may receive information from another structure in the wireless communications network 100 through the receiving port 705. Since the receiving port 705 may be in communication with the processor 704, the receiving port 705 may then send the received information to the processor 704. The receiving port 705 may also be configured to receive other information.

The first network node 110 may further comprise the memory 706 comprising one or more memory units. The memory 706 may be arranged to be used to store data in relation to applications to perform the methods herein when being executed in the first network node 110. The memory 706 may be in communication with the processor 704. Any of the other information processed by the processor 704 may also be stored in the memory 706.

The processor 704 may be further configured to transmit or send information, such as a message to another network node to initiate the one or more actions, through a sending port 707, which may be in communication with the processor 704, and the memory 706.

The information processed by the processor 704 in relation to the embodiments of the method herein may be stored in the memory 706 which, may be in communication with the processor 704, as stated earlier, and with the communication ports, that is the receiving port 705 and the sending port 707.

Those skilled in the art will also appreciate that the different modules 701-703 described above may refer to a combination of analog and digital modules, and/or one or more processors configured with software and/or firmware, e.g., stored in memory, that, when executed by the one or more processors such as the processor 704, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-703 described above may be implemented as one or more applications running on one or more processors such as the processor 704.

Thus, the methods according to the embodiments described herein for the first network node 110 may be respectively implemented by means of a computer program product, comprising instructions, i.e., software code portions, which, when executed on at least one processor, cause the at least one processor to carry out the actions described herein, as performed by the first network node 110. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 110. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

REFERENCES

[1] Sub-cell level, multilayer degradation detection, diagnosis and recovery, H. Sanneck, P. Szilagyi, and C. Frenzel, WO2013143572 A1, Oct. 3, 2013
[2] Cell outage detection and compensation method and cell outage detection and compensation device, CN103052110 A, Apr. 17, 2013.
[3] Toward cell outage detection with composite hypothesis testing, Q. Liao, M. Wiczanowski, and S. Stanczak, in Communications (ICC), 2012 IEEE International Conference on, June 2012, pp. 4883-4887.
[4] Method and device for cell outage detection, J. Wang, X. Wang, and H. Xia, US20140043998 A1, Feb. 13, 2014
[5] A Cell Outage Detection Algorithm Using Neighbor Cell List Reports, C. Müller, M. Kaschub, C. Blankenhorn, and S. Wanke, in Proceedings of the 3 rd International Workshop on Self-Organizing Systems (IWSOS) 2008, Lecture Notes in Computer Science (LNCS) 5343, December 2008, pp. 218-229.

The invention claimed is:

1. A method performed by a management system network node responsible for network management, for detecting outage of a radio cell served by a second network node, the management system network node and the second network node operating in a wireless communications system, the method comprising:
  determining a number of incoming handovers for the radio cell of the second network node in a first measurement period,
  determining a number of incoming handovers for the radio cell of the second network node in a second measurement period, wherein the second measurement period is a previous measurement period to the first measurement period, and
  determining whether the radio cell is in outage, based on whether the determined number of incoming handovers in the first measurement period is under or equal to a threshold;
  wherein the management system network node determines that the radio cell is in outage when:
    the determined number of incoming handovers in the first measurement period is under or equal to the threshold,
    the determined number of incoming handovers in the second measurement period is higher than the threshold and one of:
      one or more performance indicators in the first measurement period have not been provided by the second network node, wherein the performance indicators are high-level indicators obtained from performance counters in the wireless communications system, wherein the performance counters are user made measurements for wireless devices or base stations that provides information about a cell and the network performance, or
      the one or more performance indicators in the first measurement period have been provided by the second network node and the radio cell is not active in the first measurement period, or
      the one or more performance indicators in the first measurement period have been provided by the second network node and the radio cell is not switched off in the first measurement period.

2. The method of claim 1, further comprising, based on the determining whether the radio cell is in outage, initiating one or more actions to compensate for the outage of the radio cell.

3. The method of any of claim 1, wherein the determining whether the radio cell is in outage is based on when the determined number of incoming handovers in the first measurement period is equal to the threshold of zero.

4. The method of claim 1, wherein the determining whether the radio cell is in outage is based on when the determined number of incoming handovers in the second measurement period is equal to the threshold of zero.

5. The method according to claim 1,
  wherein the determining whether the radio cell is in outage, is further based on when one or more performance indicators have been provide by the second network node in the first measurement period,
  wherein the determining whether the radio cell is in outage, is further based on when at least one of: the radio cell is active in the first measurement period, or the radio cell is switched off in the first measurement period, and
  further comprising:
    discarding the radio cell when the management system network node determines that at least one of:
    the determined number of incoming handovers in the first measurement period is higher than the threshold of zero,
    the determined number of incoming handovers in the second measurement period is equal to the threshold of zero,
    the one or more performance indicators in the first measurement period have been provided by the second network node and the radio cell is active in the first measurement period, and
    the one or more performance indicators in the first measurement period have been provided by the second network node and the radio cell is switched off in the first measurement period.

6. A non-transitory computer-readable storage medium, having stored thereon a computer program, comprising instructions which, when executed on at least one processor, cause the at least one processor to carry out a method of a management system network node responsible for network management, for detecting outage of a of a radio cell served by a second network node, the management system network node and the second network node operating in a wireless communication system, the method comprising:
  determining a number of incoming handovers for the radio cell of the second network node in a first measurement period, and
  determining a number of incoming handovers for the radio cell of the second network node in a second measurement period, wherein the second measurement period is a previous measurement period to the first measurement period, and
  determining whether the radio cell is in outage, based on whether the determined number of incoming handovers in the first measurement period is under or equal to a threshold;

wherein the management system network node determines that the radio cell is in outage when:
the determined number of incoming handovers in the first measurement period is under or equal to the threshold,
the determined number of incoming handovers in the second measurement period is higher than the threshold and one of:
one or more performance indicators in the first measurement period have not been provided by the second network node, wherein the performance indicators are high-level indicators obtained from performance counters in the wireless communications system, wherein the performance counters are user made measurements for wireless devices or base stations that provides information about a cell and the network performance, or
the one or more performance indicators in the first measurement period have been provided by the second network node and the radio cell is not active in the first measurement period, or
the one or more performance indicators in the first measurement period have been provided by the second network node and the radio cell is not switched off in the first measurement period.

7. A management system network node responsible for network management, for detecting outage of a radio cell served by a second network node, the management system network node and the second network node being configured to operate in a wireless communications system, the management system network node comprising:
a processor; and
a memory containing instructions executable by said processor whereby the management system network node being further configured to:
determine a number of incoming handovers for the radio cell of the second network node in a first measurement period,
determine a number of incoming handovers for the radio cell of the second network node in a second measurement period, wherein the second measurement period is a previous measurement period to the first measurement period, and
determine whether the radio cell is in outage, based on whether the determined number of incoming handovers in the first measurement period is under or equal to a threshold;
wherein the management system network node is configured to determine that the radio cell is in outage when:
the determined number of incoming handovers in the first measurement period is under or equal to the threshold,
the determined number of incoming handovers in the second measurement period is higher than the threshold and one of:
one or more performance indicators in the first measurement period have not been provided by the second network node, wherein the performance indicators are high-level indicators obtained from performance counters in the wireless communications system, wherein the performance counters are user made measurements for wireless devices or base stations that provides information about a cell and the network performance, or
the one or more performance indicators in the first measurement period have been provided by the second network node and the radio cell is not active in the first measurement period, or
the one or more performance indicators in the first measurement period have been provided by the second network node and the radio cell is not switched off in the first measurement period.

8. The management system network node of claim 7, being further configured to, based on the determination of whether the radio cell is in outage, to initiate one or more actions to compensate for the outage of the radio cell.

9. The management system network node of claim 7, wherein to determine whether the radio cell is in outage is based on when the determined number of incoming handovers in the first measurement period is equal to the threshold of zero.

10. The management system network node of claim 7, wherein to determine whether the radio cell is in outage is based on when the determined number of incoming handovers in the second measurement period is equal to the threshold of zero.

11. The management system network node according to claim 7, wherein the determining whether the radio cell is in outage, is further based on when one or more performance indicators have been provide by the second network node in the first measurement period,
wherein the determining whether the radio cell is in outage, is further based on when at least one of: the radio cell is active in the first measurement period, or the radio cell is switched off in the first measurement period, and
wherein the management system network node is further configured to:
discard the radio cell when the management system network node determines that at least one of:
the determined number of incoming handovers in the first measurement period is higher than the threshold of zero,
the determined number of incoming handovers in the second measurement period is equal to the threshold of zero,
the one or more performance indicators in the first measurement period have been provided by the second network node and the radio cell is active in the first measurement period, and
the one or more performance indicators in the first measurement period have been provided by the second network node and the radio cell is switched off in the first measurement period.

* * * * *